United States Patent
Eaton

(10) Patent No.: US 11,772,799 B2
(45) Date of Patent: Oct. 3, 2023

(54) SEATBACK FOR A VEHICLE SEAT

(71) Applicant: Adient Aerospace, LLC, Bothell, WA (US)

(72) Inventor: Thomas Rodolph Eaton, Los Angeles, CA (US)

(73) Assignee: Adient Aerospace, LLC, Bothell, WA (US)

( * ) Notice: Subject to any disclaimer, the term of this patent is extended or adjusted under 35 U.S.C. 154(b) by 0 days.

(21) Appl. No.: 17/483,576

(22) Filed: Sep. 23, 2021

(65) Prior Publication Data
US 2022/0127004 A1 Apr. 28, 2022

Related U.S. Application Data

(60) Provisional application No. 63/104,904, filed on Oct. 23, 2020.

(51) Int. Cl.
*B64D 11/06* (2006.01)

(52) U.S. Cl.
CPC ...... *B64D 11/0639* (2014.12); *B64D 11/0636* (2014.12)

(58) Field of Classification Search
CPC .. B64D 11/0636; B64D 11/0639; B60R 7/043
See application file for complete search history.

(56) References Cited

U.S. PATENT DOCUMENTS

| | | | | |
|---|---|---|---|---|
| 6,199,948 B1 * | 3/2001 | Bush | ...................... | B60N 2/206 297/440.14 |
| 6,702,375 B1 * | 3/2004 | Laskowski | ............... | B60R 7/043 297/283.1 |
| 6,758,518 B2 * | 7/2004 | Ingram | ............... | B64D 11/0638 297/DIG. 5 |
| 7,896,433 B2 * | 3/2011 | Mayer | .................... | B60N 2/686 297/440.2 |
| 9,630,718 B2 * | 4/2017 | Scown | .................. | B64D 11/003 |
| 9,695,972 B1 | 7/2017 | Jiang et al. | | |
| 9,969,336 B2 * | 5/2018 | Dry | ......................... | B60N 2/879 |
| 10,232,747 B2 * | 3/2019 | Line | ......................... | B60N 2/32 |
| 10,427,611 B2 * | 10/2019 | Vanderpool | .......... | B60N 2/6009 |
| 11,034,453 B1 * | 6/2021 | Malecha | ............ | B64D 11/0638 |
| 2005/0110310 A1 | 5/2005 | Mayer et al. | | |
| 2016/0325694 A1 | 11/2016 | Dry et al. | | |
| 2019/0217784 A1 | 7/2019 | Vanderpool et al. | | |

FOREIGN PATENT DOCUMENTS

EP 0734901 A2 10/1996

OTHER PUBLICATIONS

"Extended European Search Report Issued in European Patent Application No. 21203687.5", dated Feb. 28, 2022, 7 Pages.
Communication for the Examining Division Issued From the European Patent Office, Application No. 21203687.5, dated Dec. 22, 2022.

* cited by examiner

*Primary Examiner* — Philip F Gabler
(74) *Attorney, Agent, or Firm* — Jordan IP Law, LLC

(57) ABSTRACT

Examples of the disclosure provide a seatback for a vehicle seat, in particular an aircraft seat, comprising a seatback structure that includes a rear side having a partially circumferential outer edge and a recess which is partially surrounded by the outer edge. The recess is configured to retain a panel at least partially arranged within the recess and at least partially covered by the outer edge. The panel is detachable retained to and/or in the recess and is configured as an interchangeable and customized part.

20 Claims, 3 Drawing Sheets

SEATBACK FOR A VEHICLE SEAT

CROSS-REFERENCE TO RELATED APPLICATION

This application claims the benefit of and priority to U.S. Provisional Application No. 63/104,904, entitled "SEATBACK FOR A VEHICLE SEAT", filed Oct. 23, 2020, which is incorporated by reference herein in its entirety.

BACKGROUND

Seatbacks of vehicle seats include various variants. For example, common seatbacks for economy aircraft seats include an item holding structure, such as a pocket, and a display for use of a passenger seated behind.

SUMMARY

Examples of the disclosure provide a seatback for a vehicle seat, in particular an aircraft seat, comprising a seatback structure. The seatback structure includes a rear side having a partially circumferential outer edge and a recess which is partially surrounded by the outer edge. The seatback structure further includes a panel at least partially arranged within the recess and at least partially covered by the outer edge, wherein the panel is detachable retained to and/or in the recess and is configured as an interchangeable and customized part.

Other examples of the disclosure provide a vehicle seat, in particular an aircraft seat, comprising a seat pan and a seatback. The seatback includes a rear side having a partially circumferential outer edge and a recess which is partially surrounded by the outer edge. The seatback further includes a panel at least partially arranged within the recess and at least partially covered by the outer edge. The panel is detachable retained to and/or in the recess and is configured as an interchangeable part.

Still other examples of the disclosure provide a seatback for a vehicle seat, in particular an aircraft seat, comprising a seatback structure having a rear side. The rear side includes a partially circumferential outer edge and a recess which is partially surrounded by the outer edge. The recess is configured to retain a panel at least partially arranged within the recess and at least partially covered by the outer edge. The panel is detachable retained to and/or in the recess and is configured as an interchangeable and customized part

BRIEF DESCRIPTION OF THE DRAWINGS

The present disclosure will become more fully understood from the detailed description given herein below and the accompanying drawings which are given by way of illustration only, and thus, are not limitative of the present disclosure, wherein.

Corresponding parts are marked with the same reference symbols in all figures.

DETAILED DESCRIPTION

Figure 1:
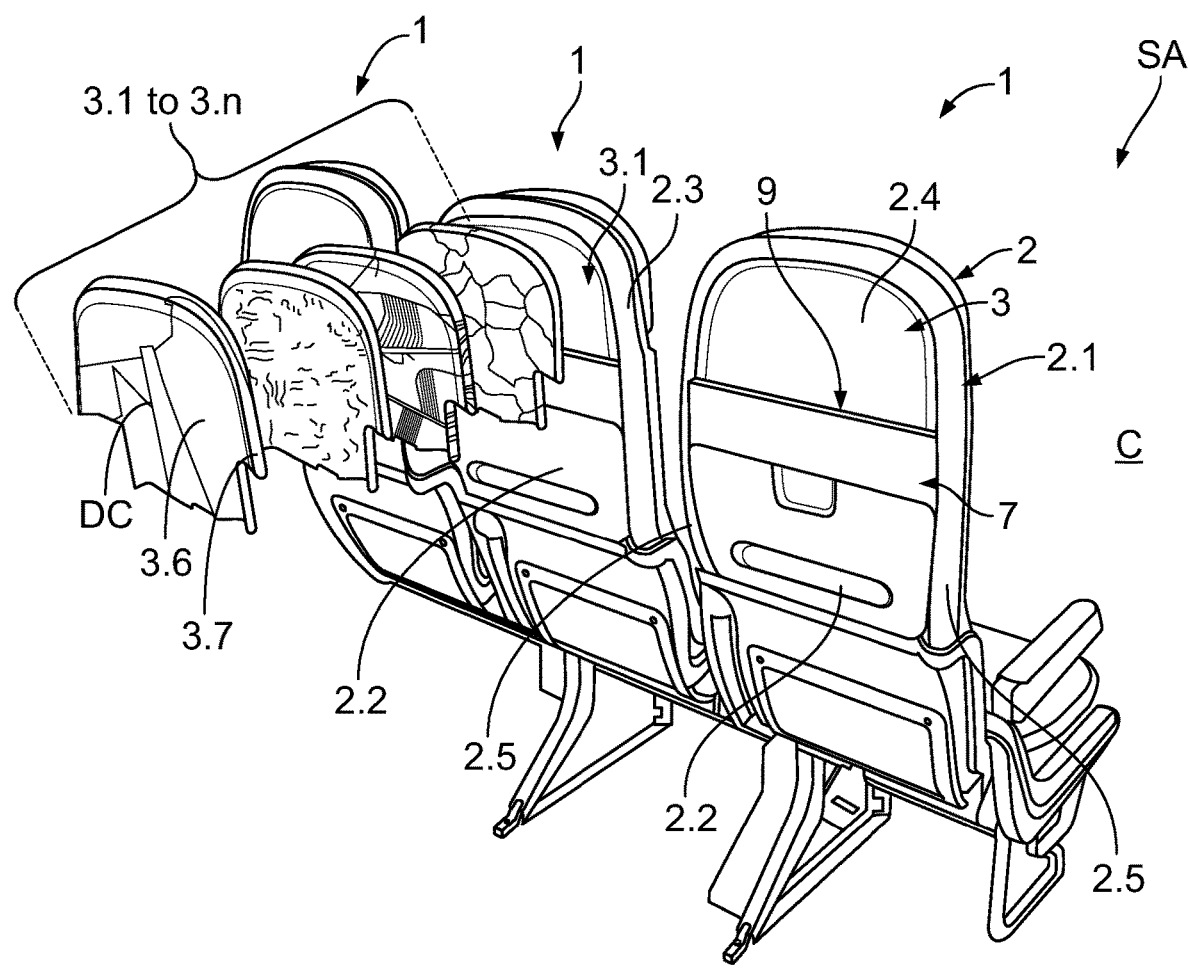
FIG. 1 shows in a perspective view an embodiment of a vehicle seat, in particular an aircraft seat, with a seatback and a number of interchangeable decorative panels.

Seatbacks of vehicle seats include various variants. Common seatbacks are very limited in their design once produced, certified and installed.

The present disclosure enables customization to happen quickly, easily and frequently without the need for recertification. Aspects of the disclosure provide opportunities to change the aesthetics of the seatback, provide an adaptable zone for the integration of functional, supplemental features like an amenities holder and/or a safety card to breathe new life into seating arrangements. In particular, the interchangeable decorative panels may be designed by a variety of decorative processes to achieve a wide range of cosmetic finishes. In some examples, the decorative panel is e.g., made of thermoplastic and/or other lightweight material.

The present disclosure provides an improved seatback for a vehicle seat, in particular an aircraft seat, comprising a seatback structure which is individually customizable according to airline decorative colors and requested, required or desired supplemental features to raise a passenger comfort feeling and safety. Aspects of the disclosure further provide an improved vehicle seat, in particular an aircraft seat.

Examples of the disclosure provide a seatback for a vehicle seat, in particular an aircraft seat, comprising a seatback structure which has a rear side having a partially circumferential outer edge and a recess which is partially surrounded by the outer edge and a panel at least partially arranged within the recess and at least partially covered by the outer edge. The panel is detachable retained to and/or in the recess and is configured as an interchangeable and customized part.

An advantage of the disclosed panel is to create a possibility to airlines to implement individual designs to the seatback of a vehicle seat. Thereby, one seatback is enabled to adapt to many different airlines and aircraft designs in view of e.g., decorative color, material appearance and supplemental features or any other adaptable features desired to be provided on a seatback for a rear passenger's use. The panel is configured as a decorative panel to increase an optical appearance to passengers and as an interchangeable, adaptable and customizable part without the need of producing a new seatback with adapted features and replacement of the seatback. The panel is detachable in a fast and simple manner. The same seatback can be used with no limitation of creativity in view of its rear side appearance. Once the seatback is installed, customization of the rear side appearance is not limited to any specific design. The panel may be produced in a later stage and installed when fully customized as desired by an airline. It is to be understood that the seatback may be used in trains, cars, busses and other passenger transport vehicles. The panel is e.g. a cover element for a rear of a seatback and/or a seatback support element and/or a holding element with receptacles to hold items e.g. of the airline and/or of the passenger. The term panel will be continued under the term decorative panel.

In some examples, the decorative panel is detachable retained to and/or in the recess at least in one of a form-fitting and/or force-fitting manner. For example, the decorative panel is detachable retained to and/or in the outer edge at least in one of a form-fitting and/or force-fitting manner. The decorative panel is detachable retained on the seatback rear side via a fastening system comprising detachable attachment elements such as clips, hooks, pins, screws, magnets or the like. In particular, an assembly, in particular attachment, and disassembly, in particular removal, of the decorative panels require no tools. The recess on the rear side of the seatback is configured as a seatback cove. The seatback cove can be used as a carrier of loose items like amenity kits.

In some examples, the outer edge is arranged on a circumference of the seatback structure and projecting substantially perpendicular away from a rear side surface of the seatback structure.

In some examples, the decorative panel comprises at least one attachment element which is detachable retained in at least one of the recess and/or the outer edge. In a mounted state of the decorative panel, the decorative panel is keyed and/or plugged into place within the recess. For example, attachment elements may be tabs, flaps, flanges, clips, hooks, pins/bolts or the like arranged around a perimeter of the decorative panel to key into receiving elements provided by the rear side of the seatback structure. The receiving elements may be slots, holes, rings or the like.

In some examples, the attachment element protrudes from an outer circumference of the decorative panel in a direction towards the recess and/or the outer edge of the seatback structure.

In some examples, the decorative panel comprises a main panel body. In some examples, the main panel body comprises at least one of a printed decorative cover and supplemental elements for passenger's use. Supplemental elements may be bonded or incorporated into a printing process of the decorative panel. For example, supplemental elements comprise at least a safety card, an advertisement, airline and destination information or the like. Further, the decorative panel is configured as a carrier having a number of supplemental elements in form of retaining openings to retain loose usable items such as amenity kits provided by the airline for the passenger. Further, the decorative panel may comprise retaining openings to be used by the passenger to store own items. Furthermore, supplemental elements may be one of a safety element such as an additional foam layer or the like.

For example, the decorative panel comprises a circumferential outer area bent in a direction away from the main panel body at least partially corresponding to the outer edge of the seatback structure.

In some examples, the seatback structure comprises an intermediate shell arranged in the recess between a rear side surface and the decorative panel. The intermediate shell may be detachable attached to and/or in the recess. The intermediate shell may comprise additional retaining elements to support and retain the decorative panel within the seatback recess.

For example, the seatback structure comprises a support element which is detachable attached to the rear side of the seatback structure and which is arranged extending between lateral sides of the seatback structure. The support element may be configured as a bar. The support element may comprise a number of fixation elements to additionally fix the decorative panel in and/or to the recess. The support element is arranged on a lower or bottom side of the decorative panel such that the decorative panel cannot drop out of the recess in a vertical direction. Further, the support element may comprise a number of supplemental features such as storage compartments for magazines and/or outlets for mobile devices, power sockets or the like.

In some examples, the rear side comprises at least an attachment device with at least one receiving element arranged in the recess and/or in the outer edge of the seatback structure. The at least one attachment device is arranged in an area of the recess.

In some examples, the attachment device is arranged on an inner circumference of the outer edge of the seatback structure. Alternatively, or additionally, an attachment device is arranged in the recess e.g., on a rear side surface.

In some examples, the decorative panel comprises at least one attachment element which is detachable retained in the receiving element in a mounted state of the decorative panel at the rear side of the seatback structure.

In addition, aspects of the disclosure provide a vehicle seat, in particular an aircraft seat, comprising at least a seat pan and a seatback.

With reference now to the Figures, FIG. 1 shows in a perspective view an embodiment of a vehicle seat 1, in particular an aircraft seat, with a seatback 2 and a number of interchangeable decorative panels 3.1 to 3.*n*. In particular, FIG. 1 shows a seating arrangement SA comprising three seats 1 arranged next to each other. For example, the seating arrangement SA is arranged within a vehicle cabin C, such as an aircraft economy cabin.

The seatback 2 comprises a seatback structure 2.1 which has a rear side 2.2 having a partially circumferential outer edge 2.3 and a recess 2.4 which is partially surrounded by the outer edge 2.3. In a mounted state of one of the decorative panels 3.1 to 3.*n*, the mounted decorative panel 3.1 to 3.*n* is at least partially arranged within the recess 2.4 and at least partially covered by the outer edge 2.3. The outer edge 2.3 is at least partially arranged around a perimeter of the decorative panel 3.1 to 3.*n* in the mounted state. The mounted decorative panel 3.1 to 3.*n* is detachable retained to and/or in the recess 2.4 and is configured as an interchangeable and customized part. Each decorative panel 3.1 to 3.*n* may differ from one another by their color, material, supplemental features or the like. Each decorative panel 3.1 to 3.*n* may be a customized part. For example, the decorative panels 3.1 to 3.*n* are substantially T-shaped.

For example, one of the decorative panels 3.1 to 3.*n* or all decorative panels 3.1 to 3.*n* is/are made of thermoplastic and lightweight material.

Figure 2:
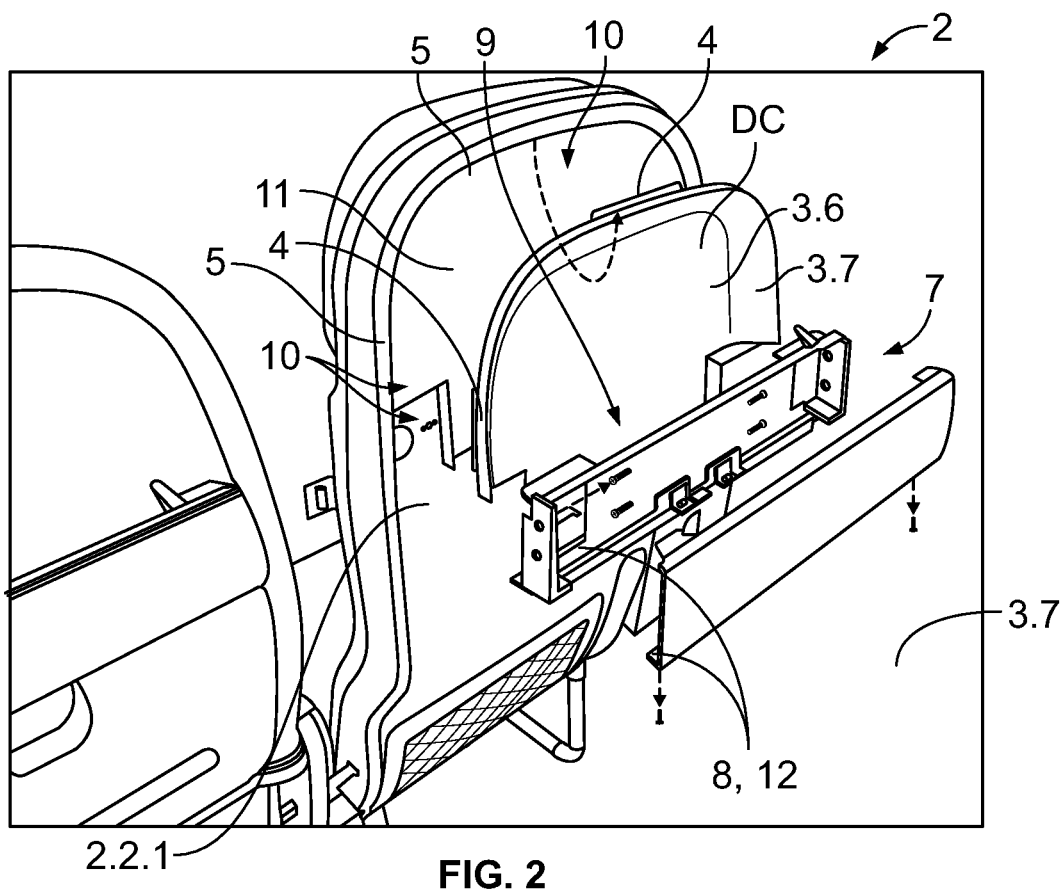
FIG. 2 shows in a perspective view an embodiment of an assembly step of a seatback having a decorative panel mounted on a rear side of the seatback.

For example, the mounted decorative panel 3.1 to 3.*n* is detachable retained to and/or in the recess 2.4 at least in one of a form-fitting and/or force-fitting manner. Additionally, or optionally, the mounted decorative panel 3.1 to 3.*n* is detachable retained to and/or in the outer edge 2.3 at least in one of a form-fitting and/or force-fitting manner. The mounted decorative panel 3.1 to 3.*n* is detachable retained on the seatback rear side 2.2 via a fastening system comprising detachable attachment elements 4, as shown in FIG. 2. The attachment elements 4 may be clips, hooks, pins, screws, magnets or the like. In particular, an assembly, in particular attachment, and disassembly, in particular removal, of the decorative panels 3.1 to 3.*n* require no tools. The recess 2.4 on the rear side 2.2 of the seatback 2 is configured as a seatback cove. The seatback cove can be used as a carrier of loose items like amenity kits.

The outer edge 2.3 is arranged on a circumference of the seatback structure 2.1 and projecting substantially perpendicular away from a rear side surface 2.2.1 which is visible in FIG. 2 of the seatback structure 2.1.

The decorative panels 3.1 to 3.*n* each comprise a number of attachment elements 4. In the mounted state of one of the decorative panels 3.1 to 3.*n*, the mounted decorative panel 3.1 to 3.*n* is detachable retained in at least one of the recess 2.4 and/or the outer edge 2.3 via the attachment elements 4. In particular, the attachment elements 4 are in detachable engagement with a counterpart arranged in the recess 2.4 and/or the outer edge 2.3. In a mounted state of one of the decorative panels 3.1 to 3.*n*, the mounted decorative panel 3.1 to 3.n is keyed and/or plugged into place within the recess 2.4. For example, attachment elements 4 may be tabs, flaps, flanges, clips, hooks, pins/bolts or the like arranged around a perimeter of each of the decorative panels 3.1 to 3.n to key into receiving elements 5, as shown in FIG. 2, provided on the rear side 2.2 of the seatback structure 2.1. The receiving elements 5 may be slots, holes, rings or the like. It is to be understood that the decorative panels 3.1 to 3.n may comprise receiving elements 5 which correspond to attachment elements 4 formed on the rear side 2.2 of the seatback structure 2.1.

The attachment elements 4 protrude from an outer circumference of the decorative panels 3.1 to 3.n in a direction towards the recess 2.4 and/or the outer edge 2.3 of the seatback structure 2.1.

Figure 3A:
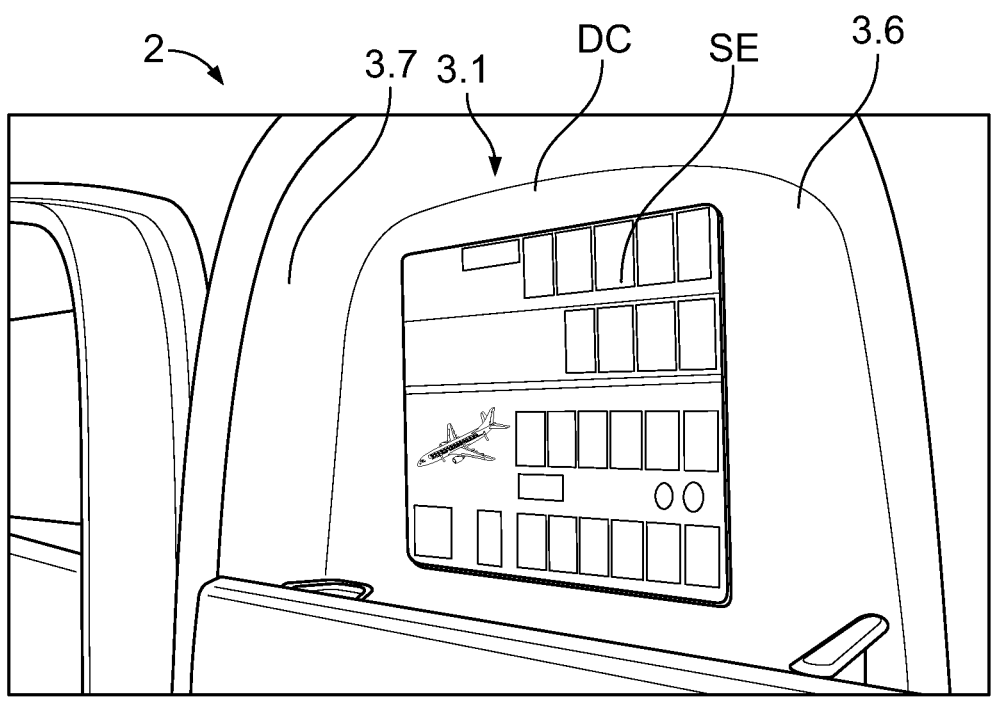
FIGS. 3A and 3B show in perspective views embodiments of a seatback having different customized decorative panels.
Figure 3B:
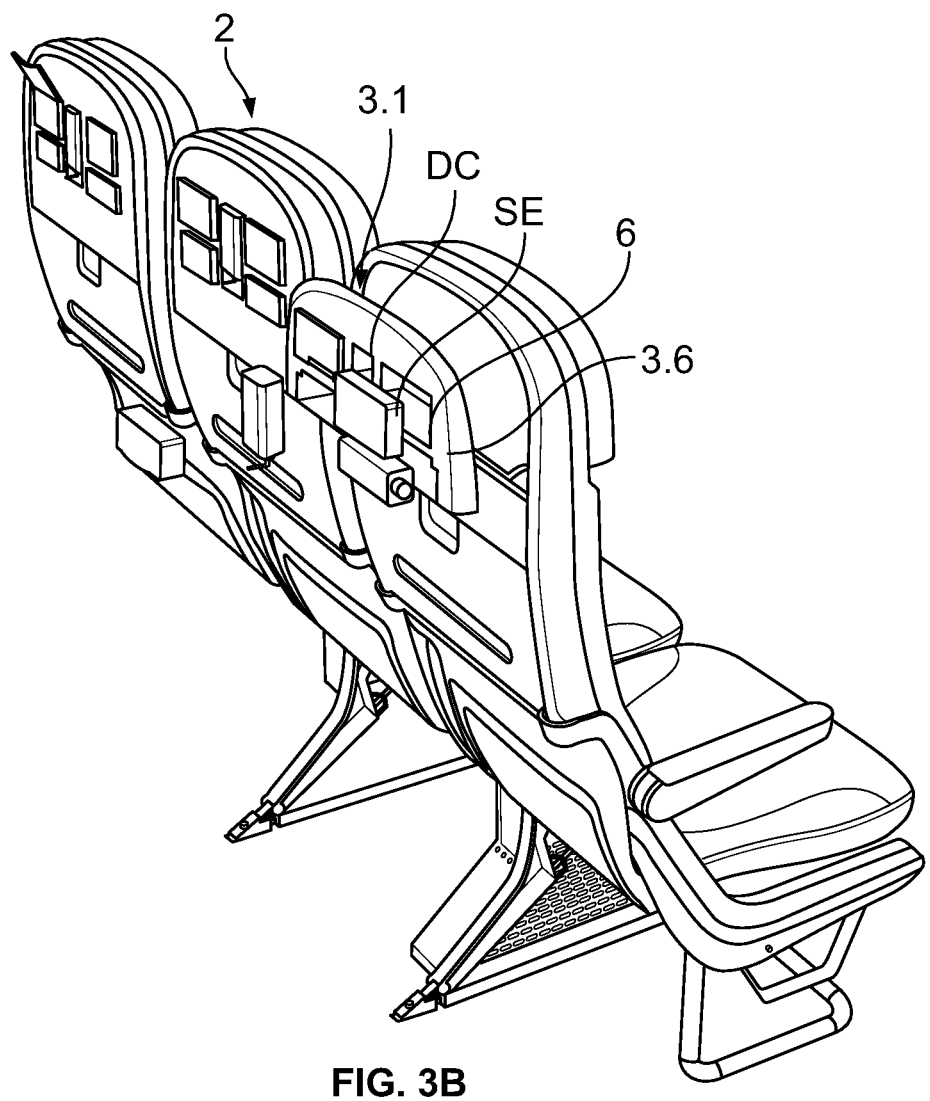

The decorative panels 3.1 to 3.n comprise each a main panel body 3.6. The main panel body 3.6 comprises at least one of a printed decorative cover DC and/or supplemental elements SE for passenger's use as shown in FIGS. 3A and 3B. Supplemental elements SE may be bonded or incorporated into a printing process of the decorative panels 3.1 to 3.n. For example, supplemental elements SE comprise at least an information card as shown in FIG. 3A such as a safety card, an advertisement card, airline and destination information cards or the like. Further, each decorative panel 3.1 to 3.n may be configured as a carrier having a number of supplemental elements SE in form of retaining openings 6 as shown in FIG. 3B to retain loose and usable items such as amenity kits provided by the airline for the passenger.

The decorative panels 3.1 to 3.n comprise each a circumferential outer area 3.7 bent in a direction away from the main panel body 3.6. The outer area 3.7 at least partially corresponds to the outer edge 2.3 of the seatback structure 2.1.

Further, the seatback structure 2.1 comprises a support element 7 which is detachable attached to the rear side 2.2 of the seatback structure 2.1 and which is arranged extending between lateral sides 2.5 of the seatback structure 2.1. The support element 7 may be configured as a bar. The support element 7 may comprise a number of fixation elements 8 as shown in FIG. 2 to additionally fix the decorative panels 3.1 to 3.n in and/or to the recess 2.4. The support element 7 is arranged on a lower or bottom side of the mounted decorative panel 3.1 to 3.n such that the decorative panel 3.1 to 3.n cannot drop or fall out of the recess 2.4 in a vertical direction. Further, the support element 7 may comprise a number of supplemental features such as storage compartments for magazines and/or outlets for mobile devices, power sockets or the like. The support element 7 may be arranged distanced from the mounted decorative panel 3.1 to 3.n at least in a center area such that there is an opening 9 provided to be used as a storage compartment, e.g. for inserting and storing items and magazines.

FIG. 2 shows in a perspective view an embodiment of an assembly step of a seatback 2 having a decorative panel 3.1 to 3.n mounted on a rear side 2.2 of the seatback 2.

The rear side 2.2 comprises at least an attachment device 10 with at least one receiving element 5 arranged in the recess 2.4 and/or in the outer edge 2.3 of the seatback structure 2.1. The attachment device 10 is arranged on an inner circumference of the outer edge 2.3 of the seatback structure 2.1. Alternatively, or additionally, an attachment device 10 is arranged in the recess 2.4 e.g. on the rear side surface 2.2.1.

The decorative panel 3.1 to 3.n comprises at least one attachment element 4 which is detachable retained in the receiving element 5 in a mounted state of the decorative panel 3.1 to 3.n at the rear side 2.2 of the seatback structure 2.1.

The seatback structure 2.1 further comprises an intermediate shell 11 arranged, e.g. detachable mounted, in and to the recess 2.4. The intermediate shell 11 is arranged between the rear side surface 2.2.1 and the decorative panel 3.1 to 3.n in the mounted state. The intermediate shell 11 may be detachable attached to and/or in the outer edge 2.3. The intermediate shell 11 may comprise additional retaining elements 12 to support and retain the decorative panel 3.1 to 3.n within the seatback recess 2.4.

FIGS. 3A and 3B show in perspective views embodiments of a seatback 2 having different customized decorative panels 3.1 to 3.n.

The examples illustrated and described herein as well as examples not specifically described herein but within the scope of aspects of the disclosure constitute an exemplary seatback for a vehicle seat.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be understood that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A seatback for a vehicle seat, comprising a seatback structure having:
   a rear side having a partially circumferential outer edge and a recess which is partially surrounded by the outer edge;
   a removable panel having an inner surface and an outer surface; the removable panel being at least partially arranged within the recess such that the inner surface faces the recess and the outer surface is at least partially covered by the outer edge, wherein the panel is detachably retained to and/or in the recess and is configured as an interchangeable; and
   an information card bonded to and/or printed on the panel.

2. The seatback according to claim 1, wherein the panel is detachably retained to and/or in the recess at least in one of a form-fitting and/or force-fitting manner.

3. The seatback according to claim 1, wherein the outer edge is arranged on a circumference of the seatback structure and projecting substantially perpendicular away from a rear side surface of the seatback structure.

4. The seatback according to claim 1, wherein the panel comprises at least one attachment element which is detachably retained in at least one of the recess and/or the outer edge.

5. The seatback according to claim 4, wherein the at least one attachment element protrudes from an outer circumference of the panel in a direction towards the recess and/or the outer edge of the seatback structure.

6. The seatback according to claim 1, wherein the panel comprises a main panel body.

7. The seatback according to claim 6, wherein the panel comprises a circumferential outer area bent in a direction away from the main panel body at least partially corresponding to the outer edge of the seatback structure.

8. The seatback according to claim 1, wherein the panel comprises at least one of a printed cover and supplemental elements for passenger use.

9. The seatback according to claim 1, wherein the seatback structure comprises an intermediate shell arranged in the recess between a rear side surface and the panel.

10. The seatback according to claim 1, wherein the seatback structure comprises a support element is detachably attached to the rear side of the seatback structure and which is arranged extending between lateral sides of the seatback structure.

11. The seatback according to claim 1, wherein the rear side comprises at least an attachment device with at least one receiving element arranged in the recess and/or in the outer edge of the seatback structure.

12. The seatback according to claim 11, wherein the attachment device is arranged on an inner circumference of the outer edge of the seatback structure.

13. The seatback according to claim 11, wherein the panel comprises at least one attachment element which is detachably retained in the receiving element in a mounted state of the panel at the rear side of the seatback structure.

14. A vehicle seat, comprising:
a seat pan; and
a seatback, the seatback including a rear side having a partially circumferential outer edge and a recess which is partially surrounded by the outer edge, and a removable panel having an inner surface and an outer surface; the removable panel being at least partially arranged within the recess such that the inner surface faces the recess and the outer surface is at least partially covered by the outer edge, the panel comprising a printed decorative cover that includes a printed information card, wherein the panel is detachably retained to and/or in the recess and is configured as an interchangeable part.

15. The vehicle seat of claim 14, wherein the recess is configured as a seatback cove.

16. The vehicle seat of claim 14, wherein the panel includes a holding element with receptacles to hold items.

17. A seatback for a vehicle seat, comprising a seatback structure having:
a rear side having a partially circumferential outer edge and a recess which is partially surrounded by the outer edge;
a removable panel having an inner surface and an outer surface; the removable panel being at least partially arranged within the recess such that the inner surface faces the recess and the outer surface is at least partially covered by the outer edge, wherein the panel is detachably retained to and/or in the recess and is configured as an interchangeable part; and
a support bar having an inner surface and an outer surface; the support bar being detachably attached to the rear side such that the inner surface of the support bar faces in part the outer surface of the removable panel; the support bar extending between lateral sides of the seatback structure and comprising a fixation element to fix the panel in and/or to the recess.

18. The seatback of claim 17, further comprising:
a number of attachment elements arranged in the recess and/or the outer edge, wherein the panel comprises a number of other attachment elements configured to be in detachable engagement with the number of attachment elements.

19. The seatback of claim 1, wherein the information card comprises a safety card, an advertisement card, an airline information card, and/or a destination information card.

20. The seatback of claim 1, wherein the panel comprises a printed decorative cover and the information card is incorporated into a printing process of the panel.

* * * * *